(12) United States Patent
Jokela et al.

(10) Patent No.: US 8,111,673 B2
(45) Date of Patent: Feb. 7, 2012

(54) MULTICAST DELIVERY QUALITY MONITORING MECHANISM

(75) Inventors: Jari Jokela, Ylöjärvi (FI); Jarkko Kneckt, Espoo (FI)

(73) Assignee: Nokia Corporation, Espoo (FI)

( * ) Notice: Subject to any disclaimer, the term of this patent is extended or adjusted under 35 U.S.C. 154(b) by 663 days.

(21) Appl. No.: 11/592,747

(22) Filed: Nov. 3, 2006

(65) Prior Publication Data

US 2007/0115865 A1 May 24, 2007

Related U.S. Application Data

(60) Provisional application No. 60/733,737, filed on Nov. 4, 2005.

(51) Int. Cl.
*H04W 4/00* (2009.01)
(52) U.S. Cl. ........................................ 370/338; 709/224
(58) Field of Classification Search .................. 370/338; 455/436
See application file for complete search history.

(56) References Cited

U.S. PATENT DOCUMENTS

| | | | | |
|---|---|---|---|---|
| 6,768,715 | B2* | 7/2004 | Hsu et al. ........................ 370/229 |
| 2002/0181423 | A1* | 12/2002 | Chen et al. ...................... 370/337 |
| 2003/0099198 | A1* | 5/2003 | Kiremidjian et al. ......... 370/230.1 |
| 2004/0105434 | A1 | 6/2004 | Baw |
| 2005/0009565 | A1 | 1/2005 | Kwak |
| 2005/0129017 | A1* | 6/2005 | Guingo et al. ................ 370/390 |

FOREIGN PATENT DOCUMENTS

| | | |
|---|---|---|
| KR | 199953979 | 7/1999 |
| WO | 02/093839 | 11/2002 |
| WO | 2004100451 | 11/2004 |

OTHER PUBLICATIONS

3 Pages Korean Office Action dated Dec. 16, 2010.
3 Pages English Language Translation Korean Office Action dated Dec. 16, 2010.
199953979 English translation to follow shortly, Jul. 15, 1999.
"Triggered QoS Measurements" Jari Jokela, Doc: IEEE 802.11-5/0294r0, May 19, 2005—http://www.ieee802.org/11/DocFiles/05/—see slides 1-10.
"Diagnostics and Troubleshooting" Emily H. Qi, Doc: IEEE 802.11-5/0905r0, Sep. 17, 2005—http://www.ieee802.org/11/DocFiles/05/—see slides 1-8.
"Broadcast and Multicast Enhancements" Jari Jokela, Doc: IEEE 802.11-05/1075r0, May 11, 2005—http://www.ieee802.org/11/DocFiles/05/—see slides 15-16.

* cited by examiner

*Primary Examiner* — Marcos Batista

(57) ABSTRACT

The present invention provides a new and unique method and apparatus for communicating information between two nodes, points or terminals in a wireless local area network (WLAN), wherein multicast diagnostic information is allowed between the two nodes, points or terminals in the wireless LAN network. The two nodes, points or terminals may include an access point (AP) or other suitable network node or terminal and a station (STA) or other suitable network node or terminal in the WLAN.

44 Claims, 3 Drawing Sheets

FIG. 1a: 802.11 Wireless Local Area Network (WLAN)

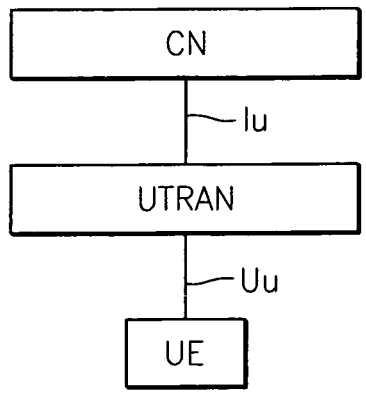
FIG. 4a: The Basic 3GPP Network
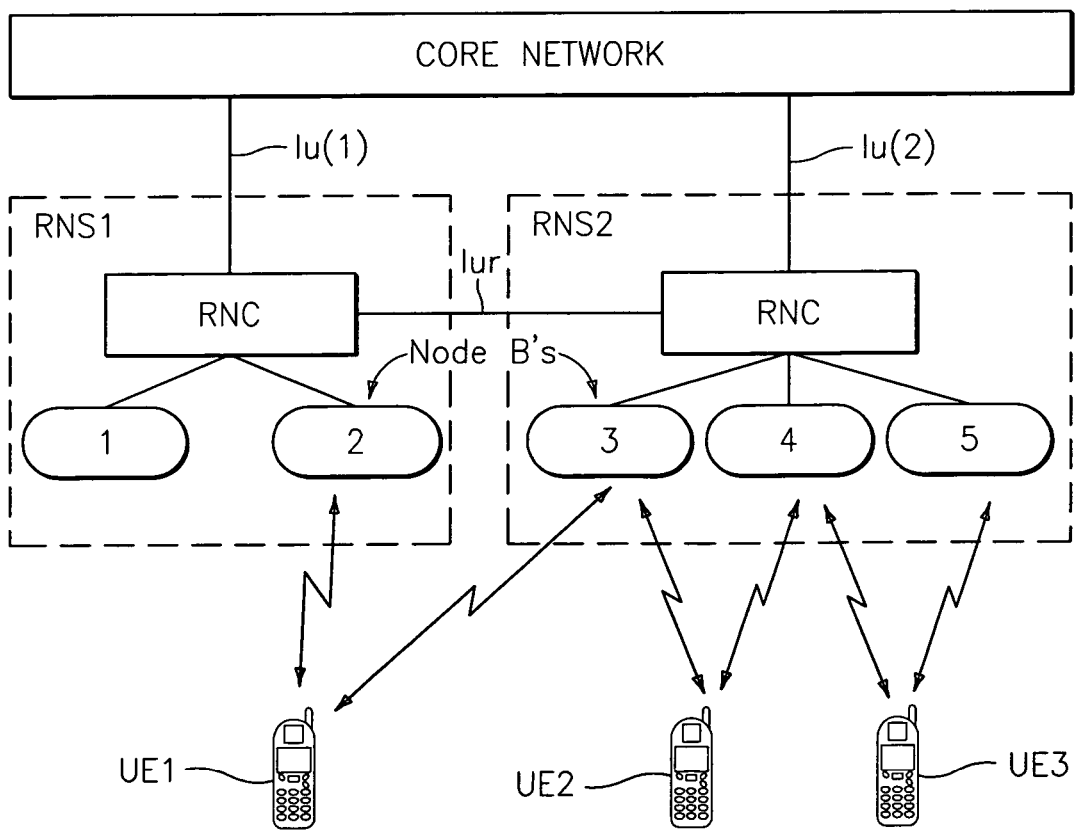
FIG. 4b: The 3GPP Network in More Detail

MULTICAST DELIVERY QUALITY MONITORING MECHANISM

CROSS-REFERENCE TO RELATED APPLICATIONS

This application claims benefit to provisional patent application Ser. No. 60/733,737, filed on 4 Nov. 2005, which is hereby incorporated by reference in its entirety.

BACKGROUND OF THE INVENTION

1. Field of Invention

The present invention is related to 802.11 WLAN, multicast frames handling, and a method and apparatus for providing a frame delivery quality monitoring mechanism for multicasted frames, including that in which the monitoring mechanism sets autonomous delivery error mechanism that reports if the reporting condition is met.

2. Description of Related Art

The current mechanism to deliver multicast frames does not specify any mechanism to control and monitor the quality of the multicast frames delivery. Currently, multicast messages are not acknowledged. In bad scenarios e.g. congestion situations, acknowledgements would be needed to create robustness for the multicast transmissions.

SUMMARY OF THE INVENTION

In its broadest sense, the present invention provides a new and unique method and apparatus for communicating information between two nodes, points or terminals in a wireless local area network (WLAN), wherein multicast diagnostic information is allowed between the two nodes, points or terminals in the wireless LAN network. The present invention provides for an exchange of the multicast diagnostic information and associated signalling between the two nodes, points or terminals in the wireless LAN network.

The two nodes, points or terminals may include an access point (AP) or other suitable network node or terminal and a station (STA) or other suitable network node or terminal in the WLAN.

The multicast diagnostic alerts requires measurements which need to be setup. During the setup phase two nodes agree on measurement types and specify triggering conditions for error report transmission. The measurements are background measurements that are always ongoing and the measuring node, point or terminal records the measurement results automatically as a part of the normal activity. If the measurement results exceed or correspond to specified triggering conditions, the measuring node, point, or terminal transmits a measurement or error report to node 2. The measurement or error report contains information related to specified triggering condition, or it may contain all measured reports as agreed during the measurement setup. The node 2 may also request measurement results at any time. The multicast diagnostics are always ongoing the node 1 responses with the current results. Triggered autonomous measurements include measurements for QoS, multicast, radio conditions, transmission/receiving distortions. These are just a few examples and the measurement types are not limited to these.

The multicast diagnostic is performed to monitor the quality of the received multicast transmissions.

In operation, the AP can issue a Multicast Diagnostic Request to request a measurement report. When the non-AP STA receives this request, it can transmit an Multicast Diagnostic Report for that time or start measuring the multicast transmission specified in the Multicast Diagnostic Request and transmit an Multicast Diagnostic Report if the triggering conditions are met. Multicast quality measurements can be used to measure the quality of the DL (from AP to non-AP STA) MAC level multicast delivery. The Multicast Diagnostic defines delivery or report Timeout conditions for the multicast service. The delivery or report timeout specifies a time interval in which a frame from the multicast or broadcast address should be received or else the triggering condition is met. If the triggering conditions are met, the receiver transmits Multicast Diagnostic Report that specifies the amount of received multicast or broadcast frames from the multicast or broadcast address and information that the triggering was performed because of a delivery or report timeout. The AP can set the same triggering conditions to all terminals that setup the multicast stream, or it may set terminal specific triggering conditions.

The scope of the invention is also intended to include a wireless local area network (WLAN) having at least two nodes or points that communicate information between the same, wherein the two nodes or points have modules configured for allowing an exchange multicast delivery monitoring information and associated signalling between the two nodes, points or terminals in the wireless LAN network, as well as a computer program product with a program code, which program code is stored on a machine readable carrier, for carrying out the steps of a method comprising allowing the exchange of Multicast Diagnostic information, multicast delivery monitoring information and associated signalling between the two nodes, points or terminals in the wireless LAN network, when the computer program is run in a module of either a first node, point or terminal, such as an Access Point (AP), a second node, point or terminal, such as a station (STA), or some combination thereof. The present invention also includes implementing the step of the method via a computer program running in a processor, controller or other suitable module in one or more network nodes, points, terminals or elements in the wireless LAN network.

The scope of the invention is intended to include: A terminal receiving a Multicast Diagnostic Request with the measurement duration set to 0, receiving multicast frames, updating a triggering condition based on the received multicast frame information, monitoring the triggering condition based on the monitoring, and/or transmitting of a Multicast Diagnostic Report if the triggering condition is met.

In another embodiment, the invention may include a terminal receiving Multicast Diagnostic Request with the measurement duration set to non-zero, receiving multicast frames over the time specified in the measurement duration, updating a triggering condition based on the received multicast frame information, monitoring the triggering condition based on the monitoring, and/or transmitting a Multicast Diagnostic Report when the measurement duration is expired.

In effect, the present invention solves WLAN multicast delivery quality measurements problem by providing an autonomous measurement mechanism for non-AP STA to monitor the quality of the multicast and broadcast frames reception.

BRIEF DESCRIPTION OF THE DRAWING

The drawing includes the following FIGS, which are not necessarily drawn to scale:

FIG. 1a shows an IEEE 802.11 WLAN system according to some embodiments of the present invention.

FIGS. 4a and 4b show diagrams of the Universal Mobile Telecommunications System (UMTS) packet network architecture, which is also known in the art.

BEST MODE OF THE INVENTION

FIG. 1a shows, by way of example, an IEEE 802.11 WLAN system, generally indicated as 2, which provides for communications between communications equipment such as mobile and secondary devices including personal digital assistants (PDAs) 3, laptops 4 and printers 5, etc. The WLAN system 2 may be connected to a wired LAN system that allows wireless devices to access information and files on a file server or other suitable device or connecting to the Internet. The devices can communicate directly with each other in the absence of a base station in a so-called "ad-hoc" network, or they can communicate through a base station, called an access point (AP) in IEEE 802.11 terminology, labeled 6 with distributed services through the AP using local distributed services (DS) or wide area extended services, as shown. In a WLAN system, end user access devices are known as stations (non-AP STAs), which are transceivers (transmitters/receivers) that convert radio signals into digital signals that can be routed to and from communications device and connect the communications equipment to access points (APs) that receive and distribute data packets to other devices and/or networks. The STAs may take various forms ranging from wireless network interface card (NIC) adapters coupled to devices to integrated radio modules that are part of the devices, as well as an external adapter (USB), a PCMCIA card or a USB Dongle (self contained), which are all known in the art.

Figure 1B:
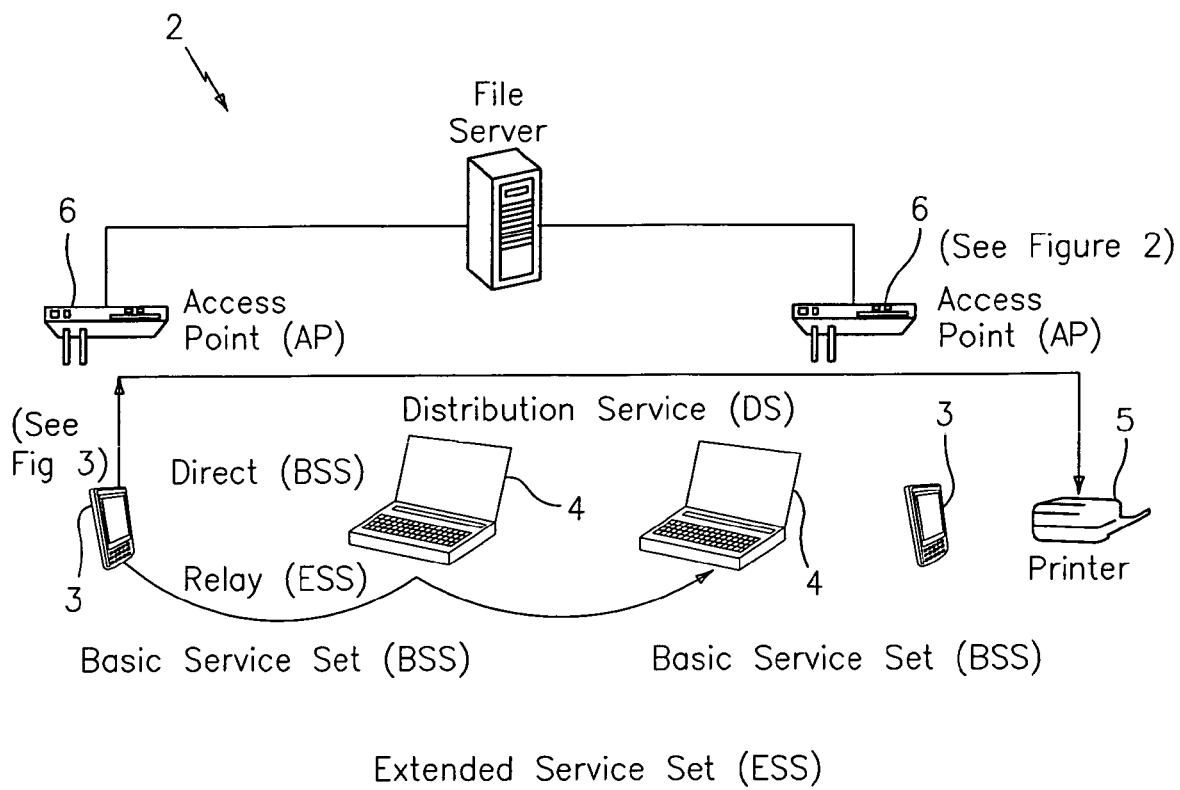
FIG. 1b shows the basic steps of the method according to some embodiments of the present invention.
Figure 1B:
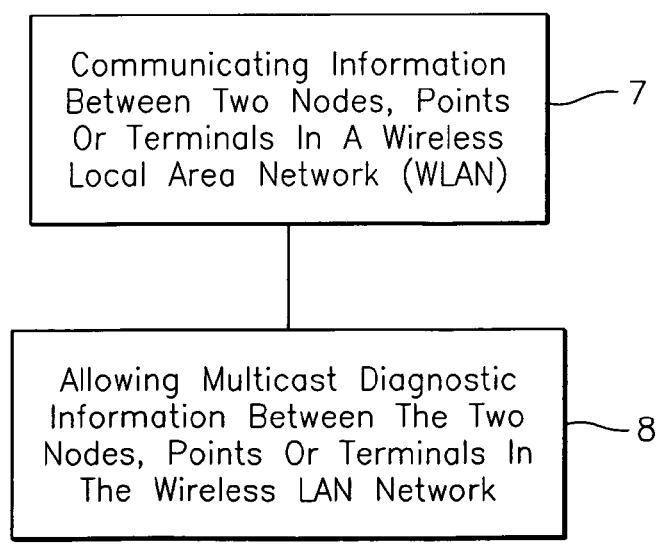

The present invention provides a new and unique method and apparatus for communicating information between two such nodes, points or terminals in such a wireless local area network (WLAN) shown in FIG. 1a, wherein multicast diagnostic information is allowed between the two nodes, points or terminals in the wireless LAN network. The present invention provides for an exchange of the multicast diagnostic information and associated signalling between the two nodes, points or terminals in the wireless LAN network. FIG. 1b shows a flowchart having the basic steps 7 and 8 of the method according to some embodiments of the present invention.

Figure 2:
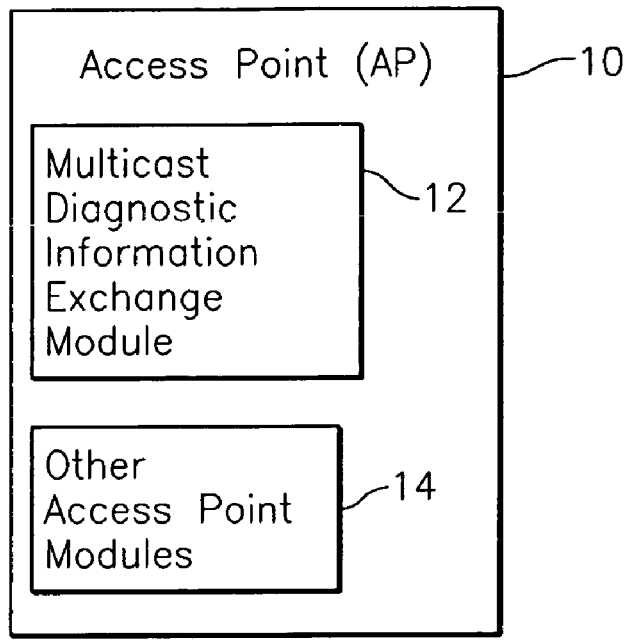
FIG. 2 shows an access point (AP) according to some embodiments of the present invention.
Figure 3:
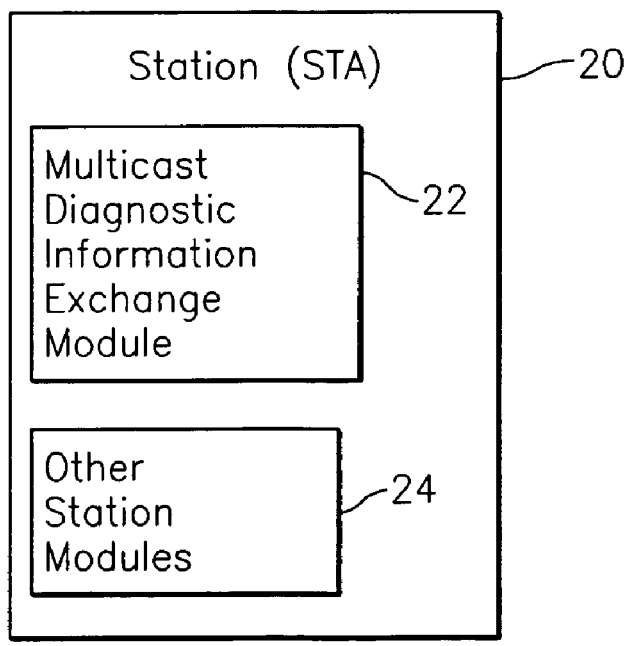
FIG. 3 shows a station (STA) according to some embodiments of the present invention.

The two nodes, points or terminals in the WLAN may include an access point (AP) or other suitable network node or terminal 10 shown in FIG. 2 and a station (STA) or other suitable network node or terminal 20 shown in FIG. 3, for operating in a wireless LAN network consistent with that shown in FIG. 1a. The AP 10 and the STA 20 have corresponding modules 12 and 22 configured for allowing the exchange of multicast diagnostic information and associated signalling between the two nodes, points or terminals in the wireless LAN network 2 in FIG. 1a. Embodiments are envisioned and the scope of the invention is intended to include an ad hoc network, where an STA sets triggered MC measurements with one or more other STAs.

The Basic Implementation

The basic implementation and cooperation of the AP 10 and STA 20 according to some embodiments of the present invention may include the following:

The multicast transmissions are not acknowledged in the 802.11 network. Therefore it is practically impossible to monitor the level of the service and the reliability of the service may be poor. The delivery monitoring mechanism according to some embodiments of the present invention is a mechanism to enable the monitoring of the multicast service without having a need to acknowledge each individual multicast frame.

In one basic implementation, the triggered multicast diagnostic alerts may be set up, after the multicast service is setup, although the scope of the invention is intended to include using the multicast alert without the multicast service setup. One example of a multicast service setup mechanism that may be used with the present invention is specified in the 802.11v standard proposal, which is hereby incorporated by reference, although the scope of the invention is intended to include using other types or kinds of multicast service setups either now known or later developed in the future. The present invention specifies the details of the Multicast service setup and specifies how it may be used.

Another possibility for triggered multicast diagnostic alerts is to use it as part of larger Autonomous Measurements frame work. The details for using triggered multicast diagnostic alerts as part of larger autonomous measurements framework are specified in other patent applications assigned to the assignee of the instant application. In these cases, the triggered multicast diagnostic alerts is set similarly as all other autonomous measurements.

The AP is able to issue a Multicast Diagnostic Request. With this Request, the AP may request a multicast diagnostic report, even if the triggering condition has not been met. When non-AP STA receives this request, it shall transmit a Multicast Diagnostic Report that covers the measurement duration specified in the Multicast Diagnostic Request. The measurement timeout shall not be set for these requests.

The triggered multicast diagnostic alerts shall be used to measure the quality of the DL MAC level multicast delivery. The mechanism is based on the received DL multicast frames.

The triggered multicast diagnostic alerts define one or more delivery or report Timeout conditions for the multicast service. If the condition(s) is met, the receiver transmits Multicast Diagnostic that indicates the reason for the triggered report. In 802.11k specification, the triggered measurements are used to set up conditions for the quality of the UL transmissions.

The AP may set the same triggering conditions to all terminals that setup multicast stream, or it may set terminal specific triggering conditions.

By way of example, one way of defining the signalling frames for implementing the present invention is described in provisional patent application Ser. No. 60/733,999, identified by docket no. WFVA/Nokia Nos. 944-4.59/NC46867, which includes one or more sections of IEEE P802.11 and is hereby incorporated by reference in its entirety. Embodiments are also envisioned and the scope of the invention is intended to include implementing the same using other types of signalling frames either now known or later developed in the future.

The logic for multicast autonomous triggering is set forth in one or more sections of IEEE 802.11 and described herein, as follows:

Enhanced Broadcast/Multicast Service Monitoring

To facilitate the service mode selection, the AP may set up triggered multicast diagnostic alerts for the multicast services. Reporting is enabled by sending Multicast Diagnostic Request to the non-AP STA.

Triggered multicast diagnostic alerts shall be used only if the service mode of the multicast group is normal (i.e., multicast traffic is sent as normal multicast frames). If service mode is changed to unicast mode, then triggered autonomous reporting for multicast service shall be disabled. An AP may set the Triggered QoS Measurement for the unicast TC or TS to which the multicast traffic is converted. The non-AP STA shall reset the frame receiving statistics if service mode is changed from multicast to unicast or vice versa.

Diagnostic Alerts—Multicast Diagnostics Reporting

Multicast Diagnostics reporting allows an AP to receive information concerning the receive statistics of multicast and broadcast traffic at associated STAs. A non-AP STA that supports Multicast Diagnostics Reporting shall set the Multicast capability bit in the Radio Management Capabilities element to 1.

An AP may send a Multicast Diagnostics request to a non-AP STA that has indicated multicast diagnostics capability. If the STA accepts the request, it shall count the number of received MSDUs with the specified multicast address during the requested Measurement Duration. This value shall be returned in a Multicast Diagnostics report.

An AP may request that a triggered Multicast Diagnostic reporting is enabled at associated non-AP STAs that have indicated multicast diagnostics capability. To enable Multicast Diagnostic reporting, the AP shall send a Measurement Request element containing a Multicast Diagnostics Request Type and with Enable and Report bits set to 1 within a Measurement Request frame. See IEEE 802.11k D6.0 (October 2006). The Multicast MAC Address and trigger conditions for diagnostic reporting shall be specified in the request.

Multicast Diagnostic reporting may be requested for broadcast traffic by setting Multicast MAC address to the broadcast address.

A non-AP STA accepting a request for multicast diagnostic reporting shall send a Multicast Diagnostics Report to the requesting STA if the specified trigger condition occurs. The measuring non-AP STA shall not send further Multicast Diagnostics Reports until the Trigger Timeout period specific in the request has expired, or revised trigger conditions have been requested.

Once accepted, Multicast Diagnostics reporting continues to be active for the specified Multicast MAC address until any of the following occurs:
  Receipt of a Measurement Request element containing a Multicast Diagnostics Request Type and with Enable bit set to 1 and Report bits set to 0 within a Measurement Request frame.
  Receipt of a Measurement Request element containing a Multicast Diagnostics Request Type, with Enable and Report bits set to 1, but with no trigger conditions.
  The STA leaves the Multicast Group or disassociates Implementation of the Functionality of the Modules The functionality of the AP 10 and STA 20 described above may be implemented in the corresponding modules 12 and 22 shown in FIGS. 2 and 3. By way of example, and consistent with that described herein, the functionality of the modules 12 and 22 may be implemented using hardware, software, firmware, or a combination thereof, although the scope of the invention is not intended to be limited to any particular embodiment thereof. In a typical software implementation, the module 12 and 22 would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology now known or later developed in the future. Moreover, the scope of the invention is intended to include the modules 12 and 22 being a stand alone modules, as shown, or in the combination with other circuitry for implementing another module.

The other modules 14 and 24 and the functionality thereof are known in the art, do not form part of the underlying invention per se, and are not described in detail herein. For example, the other modules 24 may include other modules that formal part of a typical mobile telephone or terminal, such as a UMTS subscriber identity module (USIM) and mobile equipment (ME) module, which are known in the art and not described herein.

In operation, the present invention enables background measurements that can be used to monitor the multicast delivery quality; and reduces the overhead that is needed for acknowledgements handling, because non-AP STA may not need to send acknowledgements. Only if conditions are met, the error report is transmitted.

The present invention also provides suitable mechanism for a large amount of receivers. The transmission errors occur to non-AP STA, whose connection has the most delivery errors. These terminals may be identified and delivery may be handled differently to these terminals.

Universal Mobile Telecommunications System (UMTS) Packet Network Architecture

FIGS. 4a and 4b show a Universal Mobile Telecommunications System (UMTS) packet network architecture. In FIG. 4a, the UMTS packet network architecture includes the major architectural elements of user equipment (UE), UMTS Terrestrial Radio Access Network (UTRAN), and core network (CN). The UE is interfaced to the UTRAN over a radio (Uu) interface, while the UTRAN interfaces to the core network (CN) over a (wired) Iu interface. FIG. 4b shows some further details of the architecture, particularly the UTRAN, which includes multiple Radio Network Subsystems (RNSs), each of which contains at least one Radio Network Controller (RNC). In operation, each RNC may be connected to multiple Node Bs which are the UMTS counterparts to GSM base stations. Each Node B may be in radio contact with multiple UEs via the radio interface (Uu) shown in FIG. 4a. A given UE may be in radio contact with multiple Node Bs even if one or more of the Node Bs are connected to different RNCS. For instance, a UE1 in FIG. 4b may be in radio contact with Node B2 of RNS1 and Node B3 of RNS2 where Node B2 and Node B3 are neighboring Node Bs. The RNCs of different RNSs may be connected by an Iur interface which allows mobile UEs to stay in contact with both RNCs while traversing from a cell belonging to a Node B of one RNC to a cell belonging to a Node B of another RNC. The convergence of the IEEE 802.11 WLAN system in FIG. 1a and the (UMTS) packet network architecture in FIGS. 4a and 4b has resulted in STAs taking the form of UEs, such as mobile phones or mobile terminals. The interworking of the WLAN (IEEE 802.11) shown in FIG. 1a with such other technologies (e.g. 3GPP, 3GPP2 or 802.16) such as that shown in FIGS. 2a and 2b is being defined at present in protocol specifications for 3GPP and 3GPP2. The scope of the invention is intended to include implementations of the same in relation to such a UMTS packet network architecture.

List of Abbreviations

AC Access Category
A-MSDU Aggregated MSDU
AP Access Point
MAC Medium access control
MSDU MAC service data unit
QAP QoS access point
QOS Quality of service
QSTA QoS station
STA Station Scope of the Invention Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

What we claim is:

1. A method comprising:
   sending from a first node a request for multicast diagnostic information to a second node, wherein the request comprises information on at least one multicast transmission quality related triggering condition relating to at least one delivery or report timeout condition and time value relating to the at least one delivery or report timeout condition; and
   receiving in the first node a multicast diagnostic report if the second node does not receive the multicast frames within the time value and the request contains information that a multicast diagnostic report is to be sent when a report timeout is reached.

2. A method according to claim 1, wherein the first node is an access point or other suitable network node, point or terminal.

3. A method according to claim 1, wherein the request includes a measurement request element containing a multicast diagnostics request type, one or more triggering conditions, or both.

4. A method according to claim 1, wherein the multicast diagnostic information includes a measurement or error report with a multicast diagnostics report field covering a measurement duration specified in the request.

5. A method according to claim 1, wherein the multicast diagnostic information includes multicast quality measurements that can be used to measure the quality of a downlink medium access control level multicast delivery.

6. A method according to claim 1, wherein the multicast diagnostic information includes an error report that specifies measurements for quality of service, or received frames, or radio conditions, or transmission/receiving distortions, or some combination thereof.

7. A method according to claim 1, wherein the multicast diagnostic information includes a report in the case where the other node, point or terminal does not receive any multicast frame within a delivery timeout or the report timeout.

8. A method according to claim 1, wherein the first node agrees on measurement types and specify triggering conditions for error report transmission with another node, point or terminal in the wireless local area network.

9. A method according to claim 1, wherein one or more triggering conditions is updated based at least partly on the multicast diagnostic information received.

10. A method according to claim 1, wherein the method further comprises implementing the method via a computer program running in a processor, controller or other suitable module in the first node.

11. A method according to claim 1, wherein the report timeout specifies a time interval in which a frame from a multicast or broadcast address should be received or else the least one multicast transmission quality related triggering condition is met.

12. Apparatus comprising:
    at least one processor and at least one memory including computer program code, the at least one memory and the computer program code configured to, with the at least one processor, cause the apparatus at least to:
    send from a first node a request for multicast diagnostic information to a second node, wherein the request comprises information on at least one multicast transmission quality related triggering condition relating to at least one delivery or report timeout condition and a time value relating to the at least one delivery or report timeout condition;
    receive in the first node a multicast diagnostic report if the second node does not receive the multicast frames within the time value and the request contains information that a multicast diagnostic report is to be sent when a report timeout is reached.

13. Apparatus according to claim 12, wherein the first node is an access point or other suitable network node, point or terminal.

14. Apparatus according to claim 12, wherein the request includes a measurement request element containing a multicast diagnostics request type, one or more triggering conditions, or both.

15. Apparatus according to claim 12, wherein the multicast diagnostic information includes a measurement or error report with a multicast diagnostics report field covering a measurement duration specified in the request.

16. Apparatus according to claim 12, wherein multicast diagnostic information includes multicast quality measurements that can be used to measure the quality of a downlink medium access control level multicast delivery.

17. Apparatus according to claim 12, wherein multicast diagnostic information includes an error report that specifies measurements for quality of service, or received frames, or radio conditions, or transmission/receiving distortions, or some combination thereof.

18. Apparatus according to claim 12, wherein the multicast diagnostic information includes a report in the case where the second node does not receive any multicast frame within a delivery timeout or the report timeout.

19. Apparatus according to claim 12, wherein the at least one memory and the computer program code are configured to, with the at least one processor, cause the apparatus at least to are configured to agree on measurement types and specify triggering conditions for error report transmission with another node, point or terminal in the wireless local area network.

20. Apparatus according to claim 12, wherein one or more triggering conditions is updated based at least partly on the multicast diagnostic information received.

21. Apparatus according to claim 12, wherein the report timeout specifies a time interval in which a frame from a multicast or broadcast address should be received or else the least one multicast transmission quality related triggering condition is met.

22. A non-transitory computer-readable storage medium having computer-executable components for carrying out a method comprising:
   sending from a first node a request for multicast diagnostic information to a second node, wherein the request comprises information on at least one multicast transmission quality related triggering condition relating to at least one delivery or report timeout condition and a time value relating to the at least one delivery or report timeout condition; and
   receiving in the first node a multicast diagnostic report if the second node does not receive the multicast frames within the time value and the request contains information that the multicast diagnostic report is to be sent when a report timeout is reached.

23. A method comprising:
   receiving in a first node a request for multicast diagnostic information from a second node, wherein the request comprises information on at least one multicast transmission quality related triggering condition relating to at least one delivery or report timeout condition and a time value relating to the at least one delivery or report timeout condition; and
   if the first node does not receive the multicast frames within the time value, then transmitting from the first node the multicast diagnostic report if the request contains information that the multicast diagnostic report is to be sent when a report timeout is reached.

24. A method according to claim 23, wherein the first node is a station or other suitable network node, point or terminal.

25. A method according to claim 23, wherein the request includes a measurement request element containing a multicast diagnostics request type, one or more triggering conditions, or both.

26. A method according to claim 23, wherein the multicast diagnostic information includes a measurement or error report with a multicast diagnostics report field covering a measurement duration specified in the request.

27. A method according to claim 23, wherein the multicast diagnostic information includes multicast quality measurements that can be used to measure the quality of a downlink medium access control level multicast delivery.

28. A method according to claim 23, wherein the multicast diagnostic information includes an error report that specifies measurements for quality of service, or received frames, or radio conditions, or transmission/receiving distortions, or some combination thereof.

29. A method according to claim 23, wherein the multicast diagnostic information includes a report in the case where the first node does not receive any multicast frame within a delivery timeout or the report timeout.

30. A method according to claim 23, wherein the first node agrees on measurement types and specify triggering conditions for error report transmission with another node, point or terminal in the wireless network.

31. A method according to claim 23, wherein one or more triggering conditions is updated based at least partly on the multicast diagnostic information received.

32. A method according to claim 23, wherein the method further comprises implementing the method via a computer program running in a processor, controller or other suitable module in the first node.

33. A method according to claim 23, wherein the report timeout specifies a time interval in which a frame from a multicast or broadcast address should be received or else the least one multicast transmission quality related triggering condition is met.

34. Apparatus comprising:
   at least one processor and at least one memory including computer program code, the at least one memory and the computer program code configured to, with the at least one processor, cause the apparatus at least to:
   receive in a first node a request for multicast diagnostic information from a second node, wherein the request comprises information on at least one multicast transmission quality related triggering condition relating to at least one delivery or report timeout condition and a time value relating to the at least one delivery or report timeout condition; and
   if the first node does not receive the multicast frames within the time value, then the one or more modules configured to transmit from the first node the multicast diagnostic report if the request contains information that the multicast diagnostic report is to be sent when a report timeout is reached.

35. Apparatus according to claim 34, wherein the first node is a station or other suitable network node, point or terminal.

36. Apparatus according to claim 34, wherein the request includes a measurement request element containing a multicast diagnostics request type, one or more triggering conditions, or both.

37. Apparatus according to claim 34, wherein the multicast diagnostic information includes a measurement or error report with a multicast diagnostics report field covering a measurement duration specified in the request.

38. Apparatus according to claim 34, wherein multicast diagnostic information includes multicast quality measurements that can be used to measure the quality of a downlink medium access control level multicast delivery.

39. Apparatus according to claim 34, wherein multicast diagnostic information includes an error report that specifies measurements for quality of service, or received frames, or radio conditions, or transmission/receiving distortions, or some combination thereof.

40. Apparatus according to claim 34, wherein the multicast diagnostic information includes a report in the case where the second node does not receive any multicast frame within a delivery timeout or the report timeout.

41. Apparatus according to claim 34, wherein the at least one memory and the computer program code are configured to, with the at least one processor, cause the apparatus at least to agree on measurement types and specify triggering conditions for error report transmission with another node, point or terminal in the wireless local area network.

42. Apparatus according to claim 34, wherein one or more triggering conditions is updated based at least partly on the multicast diagnostic information received.

43. Apparatus according to claim 34, wherein the report timeout specifies a time interval in which a frame from a multicast or broadcast address should be received or else the least one multicast transmission quality related triggering condition is met.

44. A non-transitory computer-readable storage medium having computer-executable components for carrying out a method comprising:
   receiving in a first node a request for multicast diagnostic information from a second node, wherein the request comprises information on at least one multicast transmission quality related triggering condition relating to at least one delivery or report timeout condition and a time value relating to the at least one delivery or report timeout condition; and if the first node does not receive the multicast frames within the time value, then transmitting from the first node the multicast diagnostic report if the request contains information that the multicast diagnostic report is to be sent when a report timeout is reached.

* * * * *